United States Patent [19]

Bright et al.

[11] Patent Number: 5,785,430
[45] Date of Patent: Jul. 28, 1998

[54] ECCENTRIC BEARING ASSEMBLY

[75] Inventors: James Arthur Bright; Huang-Tsang Chang. both of Dayton. Ohio

[73] Assignee: General Motors Corporation. Detroit. Mich.

[21] Appl. No.: 766,078

[22] Filed: Dec. 16, 1996

[51] Int. Cl.$^6$ ............................ F16C 33/58; F04B 1/04
[52] U.S. Cl. ........................... 384/447; 384/569; 417/273
[58] Field of Search ................................. 384/548, 549, 384/569, 588, 447, 449; 417/273; 91/491

[56] References Cited

U.S. PATENT DOCUMENTS

| 4,629,401 | 12/1986 | Grote | 417/273 |
| 5,213,482 | 5/1993 | Reinartz et al. | 417/273 |
| 5,230,275 | 7/1993 | Hodge et al. | 384/569 X |
| 5,573,386 | 11/1996 | Schmitt et al. | 417/273 X |
| 5,577,846 | 11/1996 | Takahashi | 384/447 X |

*Primary Examiner*—Thomas R. Hannon
*Attorney, Agent, or Firm*—Jeffrey A. Sedlar

[57] ABSTRACT

An efficient, cost effective eccentric bearing assembly is provided for use in a multiple piston hydraulic pump. The eccentric bearing assembly includes a roller bearing having an annular race. The race includes a groove around its outside perimeter. The groove engagably receives partispherical faces of a pair of opposed pistons. The partispherical face evenly loads the race and rollers as the race reciprocates with the eccentric. The invention avoids the use of rotating thrust bearings and instead axially supports the piston clip with stationary surfaces. Placement of the partispherical face or an optional conical face, at the interface between the pistons and the grooved race maintains the sliding contact point for piston intake strokes near the center of the face.

8 Claims, 4 Drawing Sheets

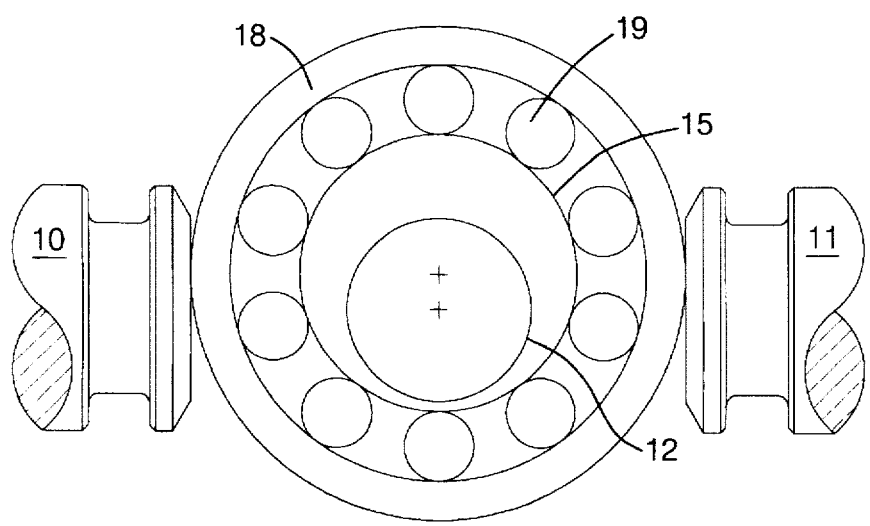
PRIOR ART
FIG. 5
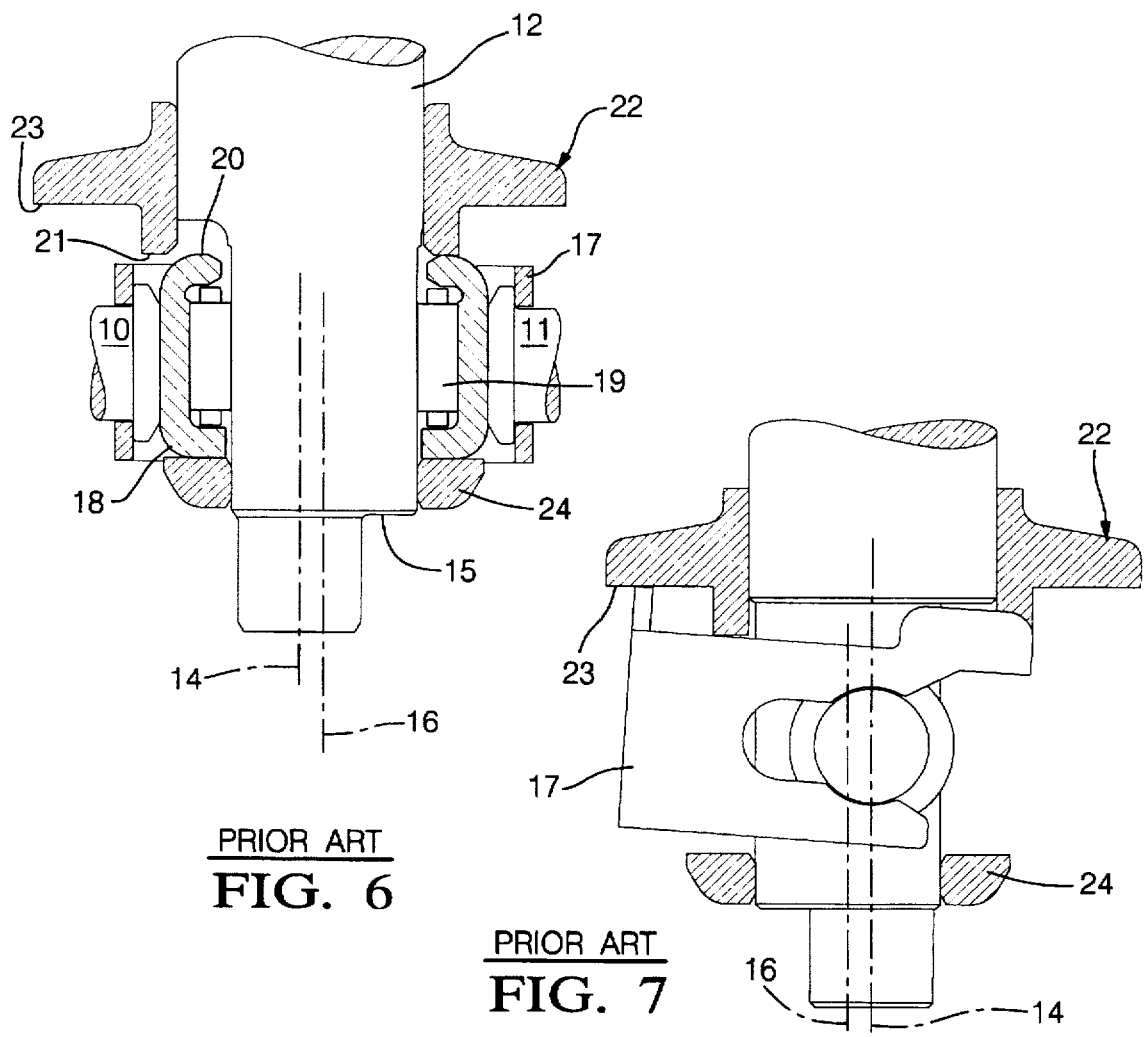
PRIOR ART
FIG. 6
PRIOR ART
FIG. 7

ECCENTRIC BEARING ASSEMBLY

TECHNICAL FIELD

The present invention relates to an eccentric bearing assembly and more particularly, to an efficient eccentric bearing assembly for use in a multiple piston hydraulic pump.

BACKGROUND OF THE INVENTION

Hydraulic or "positive displacement" pumps provide a certain amount of fluid movement for each cycle. There are two major contributors to inefficiencies in hydraulic pumps. Both contributors generally result in heat generation and degraded performance as undesirable effects. A first contributor is a result of internal fluid leakage. As output pressure and/or fluid temperature increases, efficiency generally drops off due to leakage. Therefore, pumps, especially those operating at high pressure and/or high temperature, generally have closely toleranced parts and well machined surfaces. A second contributor is mechanical loss. In a piston type pump, input torque from a motor is transmitted through a mechanical system that converts rotary shaft motion into linear piston motion to generate hydraulic pressure through fluid displacement. Especially in pumps operating at high pressures, minimizing mechanical losses in a cost efficient manner is desirable.

A known opposed piston hydraulic pump bearing assembly area is illustrated in FIGS. 5–7. The pump includes pistons 10 and 11 which operate to displace fluid and generate pressure in an associated fluid system. Pistons 10 and 11 are provided with linear motion through a motor driven shaft 12 which rotates about rotation center 14. The shaft 12 includes an eccentric 15 whose center 16 is offset from the shaft center 14. As the shaft rotates the offset eccentric induces reciprocating motion, driving the pistons.

A roller bearing assembly including annular race 18 and rollers 19 is positioned between the shaft and pistons. The race is a drawn cup element with a cylindrical side wall, and is formed to retain the rollers. A semi-annular clip 17 reaches around the shaft maintaining engagement between the ends of the pistons and the cylindrical side wall of the race. The ends of the pistons are flat for line contact engagement with the straight cylindrical side wall of the race. As shown in FIG. 5, during rotation, the line contact moves laterally across the flat face of the pistons with the center 16 of the eccentric diameter. The pistons are centered about the shaft center of rotation 14.

As the eccentric turns, the rollers 19 roll on the eccentric diameter and the inside surface of the race. The race moves laterally across the face of the pistons. Since the pistons exert a significant force on the race, the race does not generally rotate in concert with the shaft resulting in a high relative speed between the race and thrust bearings 22, 24. As the race 18 moves laterally across the face of the pistons, the pistons tend to rotate causing clip 17 to rotate about the axis of the pistons. Surface 23 of thrust bearing 22 limits rotation of clip 17. The drag of the clip on the surface 23 further reduces the mechanical efficiency of the pump assembly.

Due to a tendency of the rollers to roll around the eccentric in a spiral path, the race 18 has a tendency to move axially along the shaft. The race is supported axially at each end with thrust bearings 22 and 24. Both thrust bearings are pressed on the shaft and therefore, rotate at shaft speed. Thrust bearing 22 is pressed on the motor shaft diameter while thrust bearing 24 is pressed on the eccentric diameter. Thrust bearing support surface 21 on thrust bearing 22 is therefore, not concentric with the end surface 20 of the race 18 resulting in a partial or crescent shaped surface support while the thrust bearing support surface on thrust bearing 24 is concentric with the other end surface of the race 18 and provides a complete surface support. Relative rotational movement between the eccentric bearing race 18 and the thrust bearings 22, 24 reduces the mechanical efficiency of the pump assembly.

SUMMARY OF THE INVENTION

It has been found that in a known eccentric bearing assembly, the race turns in a direction opposite to the rotational direction of the shaft and at a much slower speed. With the known eccentric bearing assembly, the line contact between the piston ends and the race is maintained when the pistons remain perfectly perpendicular in their respective bores. However, it has also been found as part of the present invention that the line contact is generally lost as an effect of tolerances and loads on the piston, resulting in point contact at the perimeter of the piston's flat surface between the piston ends and the race. It has been found as part of the present invention that the point contact for the discharge piston on the race is near the end of the rollers. A resulting distortion of the drawn cup race near the end of the rollers due to the point contact causes the rollers that carry the load to skew or move out of parallel relative to the shaft. As a result, these rollers roll on the eccentric diameter and on the inside diameter of the race in a spiral path. This forces the race axially against the thrust bearing, thereby, introducing a mechanical inefficiency into the prior art system.

It has also been found that the race rolls across the face of the discharging piston which carries the higher hydraulic load, as the race follows the center of rotation of the eccentric. This results in sliding movement of the race across the face of the other piston which is operating in an intake stroke. It has been found as part of the present invention that this sliding movement has a tendency to turn the piston in its bore. Turning of the piston causes the otherwise stationary clip to rotate about a longitudinal center and bear against the thrust bearing which rotates with the shaft. This introduces a mechanical inefficiency into the known system as the clip translates back and forth with the pistons.

A preferred intention of the present invention is to provide an efficient, cost effective eccentric bearing assembly for use in a multiple piston hydraulic pump. In fulfilling this intention, the present invention provides a an eccentric bearing assembly with a roller bearing assembly having an annular race. The race includes a groove around its outside perimeter. The groove engagably receives parti-spherical faces of a pair of opposed pistons. The parti-spherical face evenly loads the race and rollers as the race reciprocates with the eccentric. The invention avoids the use of rotating thrust bearings and instead axially supports the piston clip with stationary surfaces.

Placement of the parti-spherical face or an optional conical face, at the interface between the pistons and the grooved race maintains the sliding contact point for piston intake strokes near the center of the face. This reduces the tendency to rotate the piston. As a result rotation of the clip about a lateral center is substantially reduced. Additionally, loading on the pistons during a discharge stroke is centered over the rollers and is much less sensitive to non-perpendicularly between the piston and the bearing.

Inclusion of a conforming shape for the groove on the outer perimeter of the race such as a concave radiused groove for the parti-spherical faced piston and a V-groove for an optional conical faced piston, is provided by precision grinding. The resultant race is stronger, leading to an increase in efficiency by reducing distortion of the race under load. The shape of the race also maintains the bearing assembly's position, substantially axially in line with the opposed pistons. Higher costs in using a precision ground race are offset by avoiding the need for thrust bearings to maintain the bearing assembly in axial position. Efficiency is improved by eliminating drag on the thrust washers.

According to a preferred embodiment of the present invention, a motor shaft rotates about a first center and includes an eccentric that rotates about a second center that is offset from the first. The shaft extends perpendicularly between a pair of opposed pistons, with the eccentric aligned between the pistons. The eccentric is encircled by an annular bearing assembly including a plurality of rollers engaging the eccentric that are carried in a race. The race includes an annular groove around its radially outer perimeter. The pistons each include a face that is shape conformed to the groove. The piston faces are maintained in the groove by a clip that reaches around the bearing and engages each of the pistons.

As the shaft rotates, the eccentric turns within the bearing and effects reciprocating linear movement of the pistons. Point contact is maintained between the piston ends and the race near the center of the groove. During linear reciprocation of the pistons, as one piston operates in a discharge stroke, the opposed piston operates in an intake stroke. After half a revolution of the eccentric, the pistons switch discharge and intake operation as the direction of linear translation reverses.

BRIEF DESCRIPTION OF THE DRAWINGS

FIG. 5 is a schematic illustration of a prior art eccentric bearing assembly.

FIG. 6 is a partial schematic illustration of the prior art eccentric bearing assembly of FIG. 5.

FIG. 7 is a partial schematic illustration of the prior art eccentric bearing assembly of FIG. 5.

DETAILED DESCRIPTION OF THE PRESENTLY PREFERRED EMBODIMENT

Figure 1:
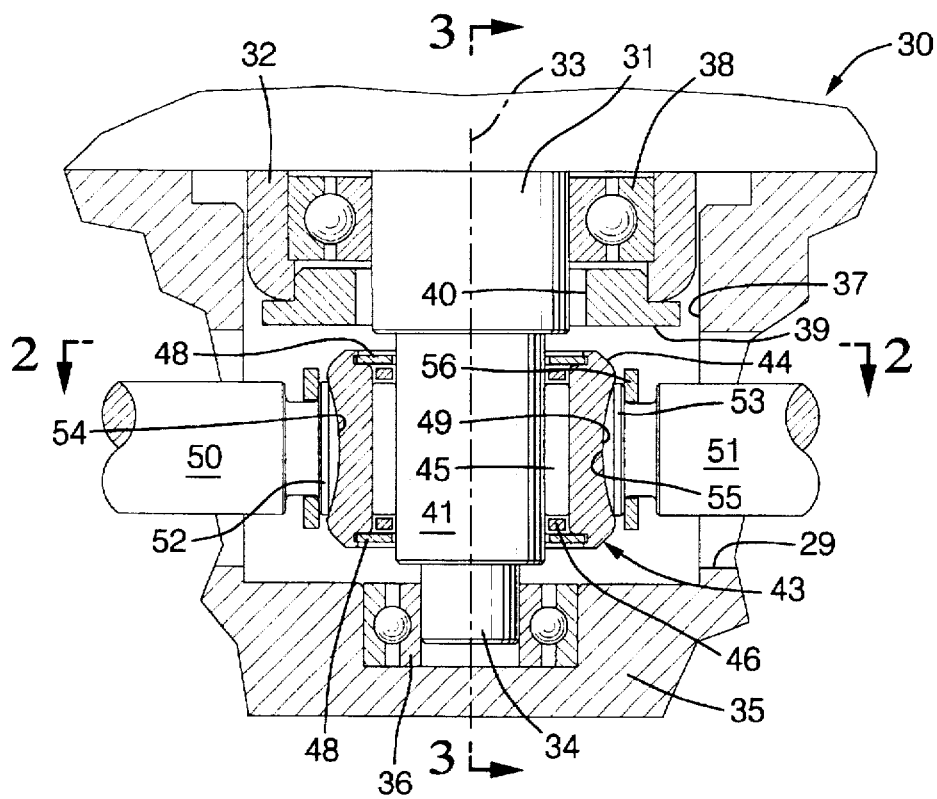
FIG. 1 is a fragmentary cross sectional illustration of an eccentric bearing assembly according to the present invention.

Referring to the drawings, illustrated in FIG. 1 is an eccentric bearing and pump assembly designated in the aggregate as 30. The assembly 30 includes a motor shaft 31 that extends from a motor 32 (partially shown), and which is rotatable about a center 33. The shaft 31 includes a reduced diameter segment 34 which is rotatably supported in body 35 by a bearing 36. The motor 32 is received within bore 37 of body 35, which, in the present embodiment is a hydraulic modulator block for use in a vehicle braking system. The motor 32 includes a ball bearing 38 supporting the shaft 31. The motor 32 also includes a nonrotating washer 39 that provides an opening 40 for receiving the shaft 31. The opening 40 is sized so that the washer 39 is spaced away from the shaft 31.

The shaft 31 has an offset eccentric segment 41, (better seen in FIG. 3), which includes a center 42 that rotates in a circle around the center 33 of shaft 31. The eccentric segment 41 is formed by a turned-down offset segment of the shaft 31 adjacent the reduced diameter segment 34. The eccentric 41 is surrounded by an annular roller bearing assembly 43. The roller bearing assembly 43 includes an annular race 44 formed by precision grinding. The race 44 carries a plurality of rollers 45 within a cage 46. The cage 46 and rollers 45 are maintained within the race 44 by a pair of retaining rings 47 and 48 which are clipped into grooves in the race 44. The rollers 45 engage the eccentric 41. Therefore, the race follows the path of the center 42 of the eccentric which rotates in a circular orbit around the center 33 of the shaft 31.

The radially outer perimeter of the race 44 includes an annular, concave, smoothly curved groove 49. The eccentric 41 and the bearing assembly 43 are centered between a pair of opposed pistons 50 and 51 which extend into the lateral bore 29 which intersects the bore 37. The lateral bore 29 extends through the bore 37 and therefore, the two include a coexistent area. The lateral bore 29 is substantially perpendicular to the bore 37.

The pistons 50 and 51 include ends 52 and 53 respectively. The ends 52 and 53 include faces 54 and 55 each of which includes a convex curved surface which is shaped conformed to the groove 49. The faces 54 and 55 are maintained in engagement with the race 44 within the groove 49 by clip 56 that reaches around the bearing assembly 43 and engages the pistons 50 and 51 behind the ends 52 and 53. As the shaft 31 rotates, the eccentric 41 effects linear translation of the pistons 50 and 51 to the left and right as viewed in FIG. 1. Engagement between the faces 54 and 55 and the race 44 within the groove 49 maintains the axial positioning of the bearing assembly 43 on the eccentric 41.

Figure 2:
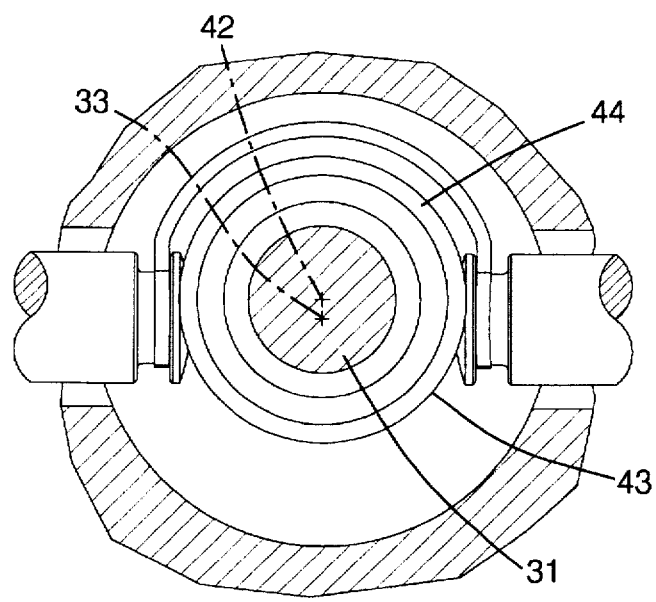
FIG. 2 is a fragmentary cross sectional illustration of the eccentric bearing assembly of FIG. 1.

Referring to FIG. 2, another view of the eccentric bearing assembly 30 is illustrated. The bearing assembly 43 follows the center 42 in a circular path around the center 33 as the shaft 31 rotates. As viewed in FIG. 2, when the shaft 31 rotates in a counterclockwise direction at motor speed, the race 44 rotates about center 42 in a clockwise direction at approximately $\frac{1}{2}^{th}$ the speed of the motor as it is guided in a circular orbit by the eccentric.

Figure 3:
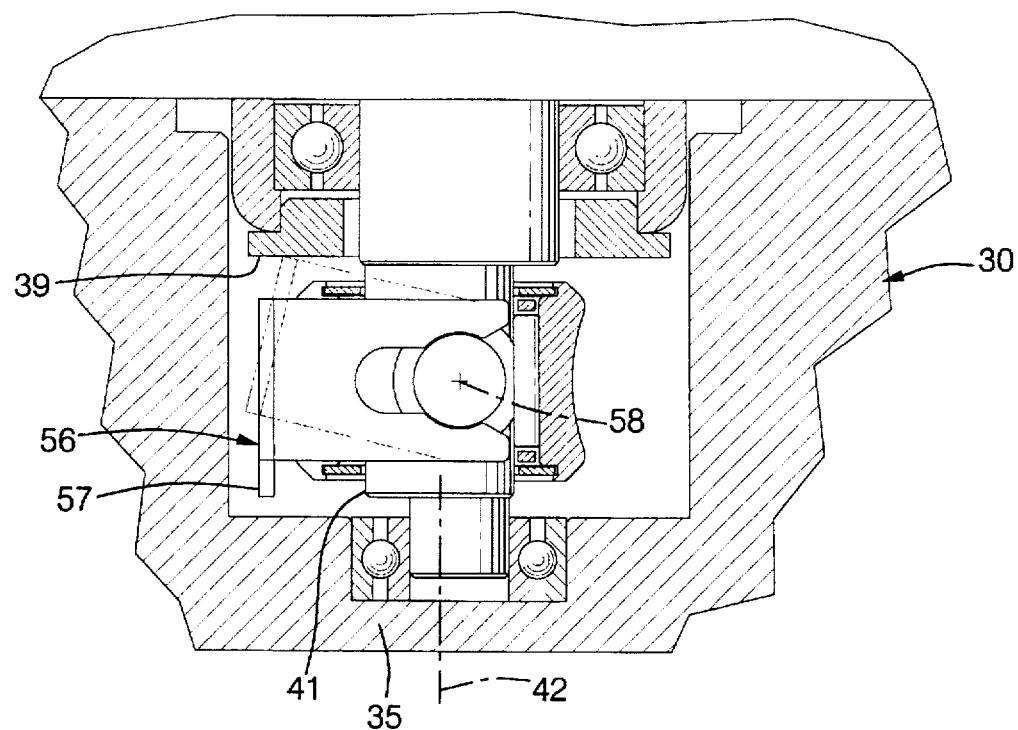
FIG. 3 is a fragmentary cross sectional illustration of the eccentric bearing assembly of FIG. 1.

Referring to FIG. 3, the eccentric 41 is more clearly illustrated in an offset fashion. The clip 56 is illustrated in two positions and as shown, includes a tab 57. During operation of the assembly 30 the clip 56 may rotate about the lateral center 58. Rotation of the clip 56 is limited by the nonrotating washer 39 and the body 35 and therefore, the clip 56 does not engage the elements of the assembly 30 that rotate at the speed of the motor 32 avoiding the introduction of drag or wear.

Figure 4:
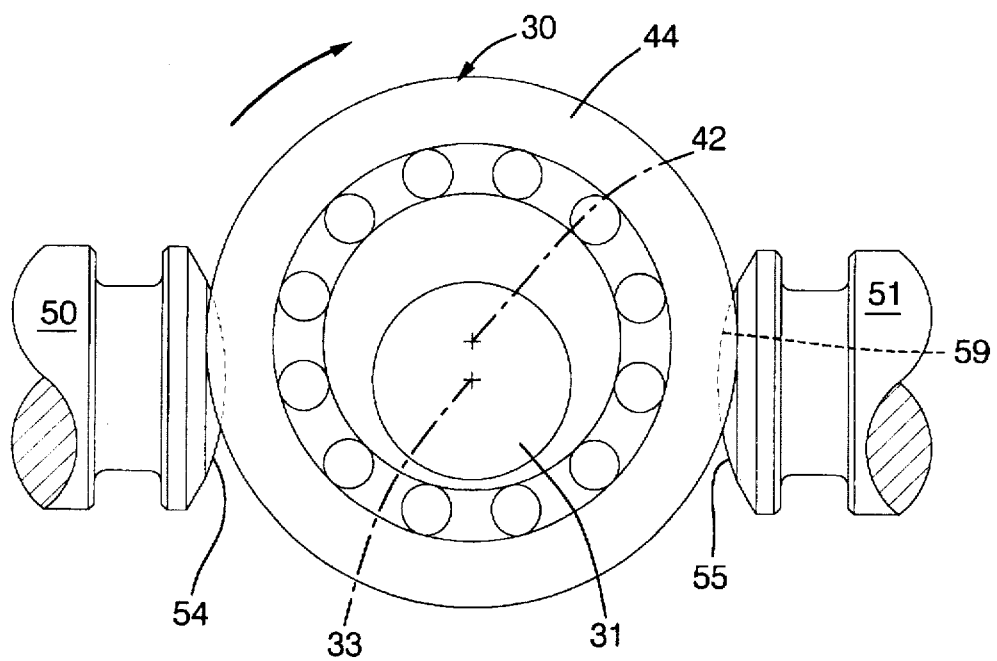
FIG. 4 is a schematic illustration of an eccentric bearing assembly according to the present invention.

Referring to FIG. 4, a schematic illustration of the eccentric bearing assembly 30 is shown with the piston 50 in a discharge stroke operating mode and piston 51 in an intake stroke operating mode. Therefore, the force applied between the face 54 of piston 50 and the race 44 is significantly greater than that applied by the piston 51. As a result, the race 44 rolls on the face 54 of the discharging piston 50 and slides on the face 55 of intaking piston 51, toward the point 59. The conforming shape of the face 55 maintains a point contact between the piston 51 and race 44 substantially at the vertical center of the groove 49, as viewed in FIG. 1. This maintains a substantially even force distribution on the rollers 45.

Figure 8:
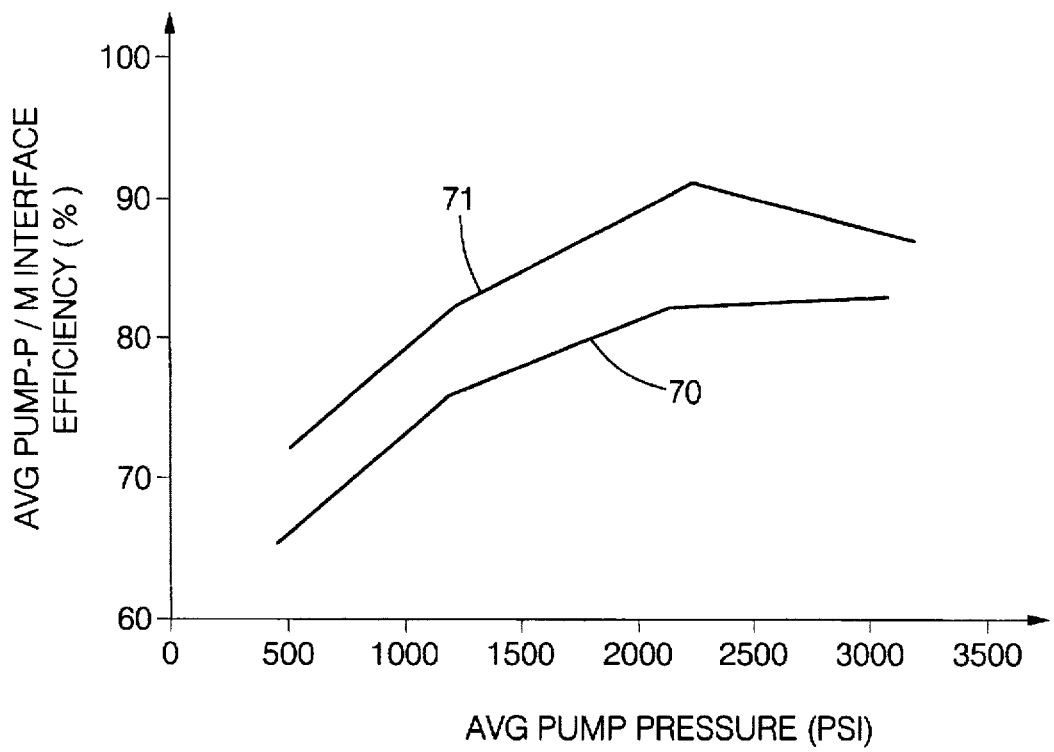
FIG. 8 are performance curves graphing overall pump efficiency in percent versus average pump pressure in psi for the eccentric bearing assemblies of FIGS. 1 and 6.

Referring to FIG. 8, the overall pump efficiency provided by the system 30 for the assemblies of FIG. 1 and FIG. 6 are graphically illustrated. Curve 70 demonstrates the percent efficiency achieved by the prior art device of FIG. 6 for various pump pressure outputs. The curve 71 graphs the similar performance characteristic for the assembly of FIG. 1 according to the present invention. The curve 71 shows a significant percent efficiency improvement over the curve 70. This results in more output power or better performance for a given input power by the motor 32. Additionally, this results in improved durability.

Figure 9:
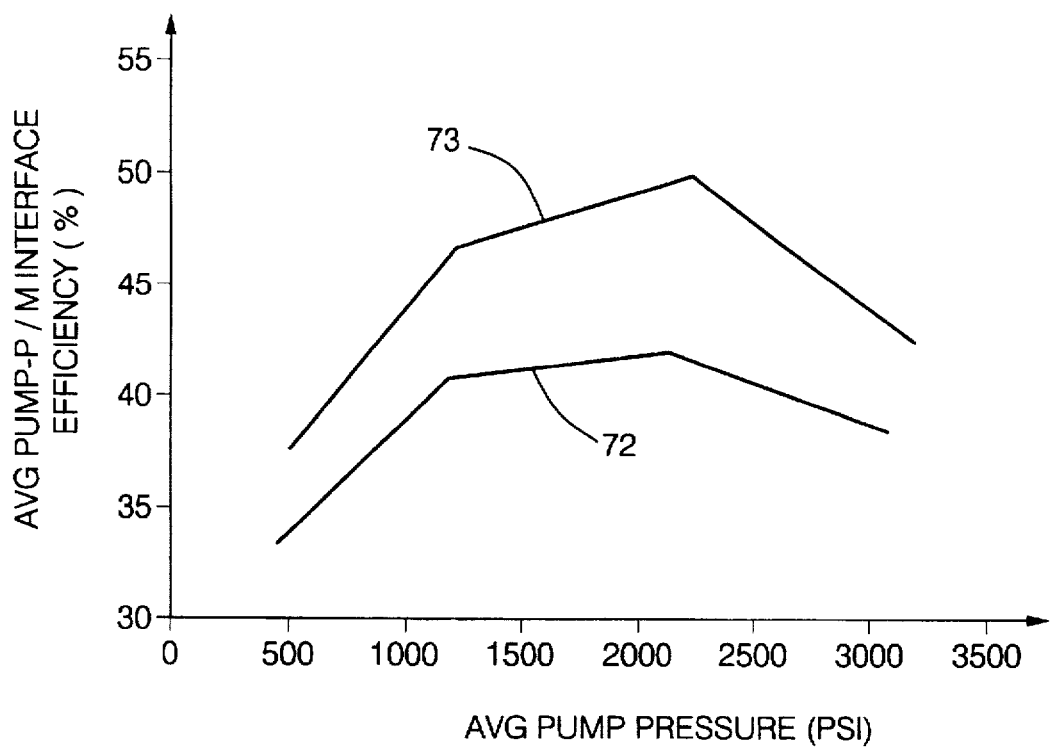
FIG. 9 are performance curves graphing mechanical efficiency in percent versus average pump pressure in psi for the eccentric bearing assemblies of FIGS. 1 and 6.

Referring to FIG. 9, the mechanical efficiency of the bearing assemblies of FIG. 1 and FIG. 6 are illustrated. The curve 72 graphs the average mechanical efficiency of the prior art embodiment of FIG. 6 over a range of pump output pressures. The curve 73 graphs the same performance characteristic for the bearing assembly according to the present invention as illustrated in FIG. 1. The curve 73 shows a significant performance improvement in mechanical efficiency as compared to the curve 72. The curve 73 shows that in the output pressure range between 2,000 and 2,500 psi the percent efficiency peaks at over 90 percent.

The grooved race in accordance with the present invention operates without rotating thrust bearings and therefore, eliminates any drag or wear that would be induced thereon. The shape conforming piston and bearing assembly facilitates elimination of the thrust bearings and provides for a optimize loading on the bearing assembly. This provides a more robust mechanical design for the eccentric bearing assembly.

We claim:

1. An eccentric bearing assembly comprising:
   a shaft rotatable about a first center and including an eccentric on the shaft that rotates about a second center that is offset from the first center;
   first and second opposed pistons disposed so that the shaft extends perpendicularly between the pistons, with the eccentric aligned between the pistons;
   an annular bearing assembly encircling the eccentric and including a plurality of rollers engaging the eccentric that are carried in a race, wherein the race includes a radially outer perimeter with an annular groove;
   wherein the pistons each include a face that is shape conformed to the groove; and
   a clip that reaches around the bearing and engages each of the pistons maintaining the piston faces in the groove and in engagement with the race;
   wherein, as the shaft rotates, the eccentric turns within the bearing and effects reciprocating linear movement of the pistons with a point contact being maintained between the piston ends and the race, maintaining a centered load on the race.

2. An eccentric bearing assembly according to claim 1 wherein an axial position of the annular bearing assembly on the shaft is maintained solely by the shape conformed engagement between the pistons and the race.

3. An eccentric bearing assembly according to claim 2 wherein when the shaft rotates in a first direction the race rotates in a second direction that is opposite the first direction.

4. An eccentric bearing assembly according to claim 2 wherein the clip is rotatable on the pistons about a lateral center and is alternately engageable with the body and a non-rotatable washer wherein the body and the washer limit rotation of the clip.

5. An eccentric bearing assembly according to claim 2 wherein the race carries the plurality of rollers that are engaged with the eccentric and wherein maintenance of the centered load on the race provides a substantially even force distribution on the rollers.

6. An eccentric bearing assembly according to claim 1 further comprising a motor supporting and rotating the shaft, wherein the pistons generate an output pressure, wherein a load is exerted on the motor in rotating the shaft to generate the output pressure, wherein the load operates with a peak efficiency minimizing a current load on the motor when the output pressure is within the range of two thousand to twenty-five hundred pounds per square inch.

7. An eccentric bearing assembly for operation in generating a hydraulic output pressure comprising:
   a body having a longitudinal bore and a lateral bore intersecting the longitudinal bore wherein the lateral bore is substantially perpendicular with the longitudinal bore, with a coexistent area defined by an intersection of the longitudinal and lateral bores, wherein the longitudinal bore includes a blind end;
   a motor engaging the body within the longitudinal bore, the motor including a rotatable shaft extending through the coexistent area, the shaft including a terminal end and an eccentric;
   a bearing positioned in the blind end of the longitudinal bore and rotatably supporting the terminal end of the shaft;
   a non-rotatable washer supported by the motor and having an opening wherein the shaft extends through the opening;
   an annular bearing assembly positioned in the coextensive area and having a plurality of rollers engaging the eccentric with a race surrounding the rollers wherein the race includes a radially outer perimeter with an annular groove;
   first and second pistons positioned in the lateral bore on opposite sides of the shaft wherein the pistons each include a end with a face that is shape conformed with the groove and wherein the faces engage the race in the groove; and
   a semi-annular clip reaching around the annular bearing assembly and engaging the pistons and maintaining engagement between the pistons and the race, wherein the clip is rotatable about a lateral axis that extends through the center of the lateral bore and wherein rotation of the clip is limited by the non-rotatable washer and the blind end of the bore;
   wherein the pistons exert a load on the race that is substantially centered on the rollers regardless of perpendicularly variances between the pistons and the race due to the shape conformed nature of the faces and the groove.

8. An eccentric bearing assembly for operation in developing a hydraulic output pressure comprising:
   a body having a longitudinal bore and a lateral bore intersecting the longitudinal bore wherein the lateral bore is substantially perpendicular with the longitudinal bore, with a coexistent area defined by an intersection of the longitudinal and lateral bores, wherein the longitudinal bore includes a blind end;

a motor engaging the body within the longitudinal bore, the motor including a rotatable shaft extending through the coexistent area, the shaft including a terminal end and an eccentric;

a bearing positioned in the blind end of the longitudinal bore and rotatably supporting the terminal end of the shaft;

a non-rotatable washer supported by the motor and having an opening wherein the shaft extends through the opening;

an annular bearing assembly positioned in the coextensive area and having a plurality of rollers engaging the eccentric with a race surrounding the rollers wherein the race includes a radially outer perimeter with an annular groove with a smoothly curved concave profile;

first and second pistons positioned in the lateral bore on opposite sides of the shaft wherein the pistons each include a end with a face that is parti-spherical to be shape conformed with the groove, wherein the face includes a center at a lateral axis and wherein the faces engage the race in the groove; and a semi-annular clip reaching around the annular bearing assembly and engaging the pistons and maintaining engagement between the pistons and the race, wherein the clip is rotatable about the lateral axis that extends through the center of the lateral bore and wherein rotation of the clip is limited by the non-rotatable washer and the blind end of the bore;

wherein when the rotatable shaft rotates, the eccentric turns within the race effecting reciprocating linear movement of the pistons with a point contact being maintained between the piston faces and the race at the lateral axis.

* * * * *